US011273994B2

(12) United States Patent
Huskisson et al.

(10) Patent No.: US 11,273,994 B2
(45) Date of Patent: Mar. 15, 2022

(54) BULK MATERIAL PRECISION IN FIELD BELT CONVEYOR LOADING APPARATUS (71) Applicant: Benetech, Inc., Aurora, IL (US)

(72) Inventors: Robert Huskisson, Oconomowoc, WI (US); Kevin Jasin, Aurora, IL (US); Robert Cucchi, Medinah, IL (US)

(73) Assignee: Benetech, Inc., Aurora, IL (US)

( * ) Notice: Subject to any disclaimer, the term of this patent is extended or adjusted under 35 U.S.C. 154(b) by 0 days.

(21) Appl. No.: 17/176,809

(22) Filed: Feb. 16, 2021

(65) Prior Publication Data

US 2021/0261355 A1 Aug. 26, 2021

Related U.S. Application Data (60) Provisional application No. 62/979,846, filed on Feb. 21, 2020.

(51) Int. Cl.
*B65G 47/44* (2006.01)
*B65G 11/00* (2006.01)
*B65G 69/18* (2006.01)

(52) U.S. Cl.
CPC ........... *B65G 47/44* (2013.01); *B65G 69/185* (2013.01); *B65G 2201/042* (2013.01); *B65G 2207/48* (2013.01)

(58) Field of Classification Search
CPC ................................ B65G 11/00; B65G 47/44
USPC ....................... 193/14, 21, 22, 25 R; 198/536
See application file for complete search history.

(56) References Cited

U.S. PATENT DOCUMENTS

| 502,194 A | 7/1893 | Johnston |
| 1,047,866 A | 12/1912 | Weller |
| 1,336,546 A * | 4/1920 | Wall .......................... F16C 3/12 74/597 |
| 1,400,658 A | 12/1921 | Brown |
| 1,524,334 A | 1/1925 | Brown |
| 1,791,371 A | 2/1931 | Onstad |
| 1,800,920 A | 4/1931 | Wilson et al. |

(Continued)

FOREIGN PATENT DOCUMENTS

| AU | 2005324346 A1 | 7/2006 |
| CA | 2594426 A1 | 7/2006 |

(Continued)

OTHER PUBLICATIONS

Korean Intellectual Property Office, International Search Report for International Application No. PCT/US2021/018320, dated Jun. 4, 2021, 4 pages.

(Continued)

*Primary Examiner* — Douglas A Hess
(74) *Attorney, Agent, or Firm* — Greensfelder, Hemker & Gale, P.C.; Richard C. Himelhoch (57) ABSTRACT

A loading apparatus for a granular material conveyor system having a conveyor belt is described. The apparatus has a chute assembly mounted to a frame over the conveyor belt and having an adjustment mechanism and a positional lock assembly connected to the chute assembly and the frame for adjusting an upper surface of the chute assembly to a desired angle within a range of possible angles. One or more side deflector panels are mounted to the frame over the conveyor belt and an adjusting rod assembly connects the deflector panels to the frame for adjusting an angle of the deflector panels.

13 Claims, 5 Drawing Sheets

(56) References Cited

U.S. PATENT DOCUMENTS

| | | | |
|---|---|---|---|
| 1,814,619 A | | 7/1931 | Carter |
| 2,219,226 A | | 10/1940 | Gerber |
| 2,859,873 A | | 11/1958 | Bresee |
| 3,568,819 A | | 3/1971 | Mann |
| 4,123,334 A | * | 10/1978 | Emery .................... C10B 33/14 |
| | | | 105/254 |
| 4,182,591 A | | 1/1980 | Stanelle |
| 4,277,214 A | | 7/1981 | Mahle et al. |
| 4,371,305 A | | 2/1983 | Pannell |
| 4,721,425 A | | 1/1988 | Strocker |
| 4,775,267 A | | 10/1988 | Yamamoto |
| 4,821,861 A | * | 4/1989 | Shanahan ............ B65G 11/083 |
| | | | 141/310 |
| 4,867,353 A | * | 9/1989 | Jacek ...................... G01F 11/02 |
| | | | 222/438 |
| 4,946,018 A | | 8/1990 | Binzen et al. |
| 5,016,686 A | | 5/1991 | Gerstenkorn |
| 5,048,669 A | * | 9/1991 | Swinderman ...... B65G 21/2081 |
| | | | 198/525 |
| 5,154,271 A | | 10/1992 | Binzen |
| 5,372,229 A | | 12/1994 | Leibling |
| 5,673,779 A | | 10/1997 | Spickelmire |
| 5,685,416 A | | 11/1997 | Bonnet |
| 5,800,112 A | | 9/1998 | Stafford |
| 5,806,324 A | * | 9/1998 | Shaw ...................... F04C 28/10 |
| | | | 62/197 |
| 6,019,147 A | | 2/2000 | Prescott et al. |
| 6,041,907 A | | 3/2000 | Bonnette |
| 6,315,159 B1 | * | 11/2001 | Paczkowski ......... B65G 11/163 |
| | | | 193/25 A |
| 6,578,694 B2 | | 6/2003 | Harris et al. |
| 7,036,647 B2 | | 5/2006 | Malmberg |
| 7,228,956 B2 | | 6/2007 | Pircon et al. |
| 7,364,034 B1 | * | 4/2008 | Clark .................... B65G 69/187 |
| | | | 198/525 |
| 7,438,171 B1 | | 10/2008 | Clark et al. |
| 7,464,661 B2 | * | 12/2008 | Baas ...................... A23P 20/12 |
| | | | 118/13 |
| 7,743,927 B2 | * | 6/2010 | Svatek .................... B07C 5/02 |
| | | | 209/656 |
| 7,855,343 B2 | * | 12/2010 | Nakagawa ............. B65G 69/16 |
| | | | 177/25.18 |
| 8,319,122 B2 | * | 11/2012 | Kishikawa .............. B65B 37/18 |
| | | | 177/25.18 |
| 8,607,964 B2 | * | 12/2013 | Kheifets ................ B65G 47/22 |
| | | | 198/534 |
| 10,752,443 B1 | * | 8/2020 | Lwali .................... B65G 11/103 |
| 2006/0151280 A1 | | 7/2006 | Pircon et al. |
| 2018/0162643 A1 | | 6/2018 | Delmoni |
| 2018/0178999 A1 | | 6/2018 | Sherwood et al. |

FOREIGN PATENT DOCUMENTS

| | | |
|---|---|---|
| CN | 2146460 Y | 11/1993 |
| CN | 101175679 A | 5/2008 |
| DE | 1531910 | 1/1970 |
| DE | 2404157 A1 | 7/1975 |
| DE | 2927316 B1 | 2/1980 |
| EP | 0062769 A1 | 10/1982 |
| EP | 1836112 B1 | 4/2012 |
| ID | P0025168 | 2/2010 |
| JP | 57047123 | 3/1982 |
| JP | 2534253 Y2 | 4/1997 |
| JP | 10305907 A | 11/1998 |
| JP | 5393983 B2 | 10/2013 |
| KR | 100908762 | 7/2009 |
| KR | 1020100120555 A | 11/2010 |
| KR | 1020130050738 A | 5/2013 |
| KR | 1020150125068 A | 11/2015 |
| LU | 70952 A1 | 3/1975 |
| MX | 269719 | 9/2009 |
| NL | 7803864 A | 10/1978 |
| WO | 2006076140 A2 | 7/2006 |
| ZA | 200705630 | 7/2008 |

OTHER PUBLICATIONS

Korean Intellectual Property Office, Written Opinion of the International Searching Authority for International Application No. PCT/US2021/018320, dated Jun. 4, 2021, 6 pages.

* cited by examiner

BULK MATERIAL PRECISION IN FIELD BELT CONVEYOR LOADING APPARATUS

CROSS-REFERENCE TO RELATED APPLICATIONS

The present invention claims priority to and the benefit of U.S. Provisional Patent Application No. 62/979,846 filed Feb. 21, 2020, the contents of which are incorporated herein by reference and made a part hereof.

FEDERALLY SPONSORED RESEARCH OR DEVELOPMENT

N/A

FIELD OF THE INVENTION

The present invention is generally directed to a loading apparatus having an adjustable chute assembly supported on a frame for transferring granular material to a conveyor belt.

DESCRIPTION OF THE PRIOR ART

Transporting and conveying granular dry material presents challenges in reducing dust generation, losses from material spillage, and wear on conveying equipment. Material spillage and dust generated from a load section of a conveyor belt, for example, presents environmental and maintenance challenges for the industry. Granular dry material includes, for example, coal, grain, bitumen, potash, ore pellets, plastic resin pellets, fertilizer, gravel, soil, seeds, nuts, wood chips and others.

The flowable materials loading apparatus of the present invention addresses these concerns. The loading apparatus is capable of being retrofitted to existing transfer chutes in use in the field. The new transfer apparatus can also be incorporated into newly fabricated liner systems such as into Benetech's MaxZone® Externally Adjustable Internal Liner system which is described in U.S. Pat. No. 8,800,756. The loading apparatus disclosed herein provides improved center loading of conveyor belts, reduces dust generation, minimizes spillage, improves belt life of the conveyor, and reduces operating costs.

SUMMARY OF THE INVENTION

A loading apparatus for a granular material conveyor system having a conveyor belt is described. The apparatus has a chute assembly mounted to a frame over the conveyor belt and a positional lock assembly connecting the chute assembly to the frame for adjusting an upper surface of the chute assembly to a desired angle within a range of possible angles. A first side deflector panel is mounted to the frame on one side of the chute assembly over the conveyor belt and an adjusting rod assembly connects the first side deflector to the frame for adjusting the first side deflector at an angle within a range of angles. A second side deflector panel is mounted to the frame on a second side of the chute assembly over the conveyor belt and an adjusting rod assembly connects the second side deflector to the frame for adjusting the second side deflector at an angle within the range of angles. The angle of the second side deflector panel can be the same as or different from the angle of the first side deflector panel.

In accordance with one aspect of the invention, a loading apparatus for a granular material conveyor system having a conveyor belt is provided. The loading apparatus comprises an adjustable chute assembly. The chute assembly is rotatable about an axis to change the angle of the chute assembly with respect to the conveyor belt. The apparatus also includes an adjustable first side deflector plate positioned along a first side of the chute assembly. The first side deflector plate is rotatable about an axis to change an angle of the first side deflector plate with respect to the conveyor belt.

The apparatus can also include an adjustable second side deflector plate positioned along a second side of the chute assembly. Like the first side deflector plate, the second side deflector plate is rotatable about an axis to change an angle of the second deflector plate with respect to the conveyor belt. The angle of the second side deflector plate can be the same or different from the angle of the first side deflector plate.

The chute assembly can be segment and include a central segment, a first flanking segment connected to a first side of the central segment and a second flanking segment connected to a second side of the central segment. The flanking segments are positioned to cause the granular material to move toward the center of the chute assembly.

A frame is provided to support the chute assembly, the first deflector plate and the second deflector plate above the conveyor belt. The frame can include a first wall positioned on a first side of the conveyor belt and a second wall positioned on a second side of the conveyor belt. The chute assembly is supported between the first wall and the second wall. Each of the first side wall and the second side wall can be formed from a plurality of elongated panels.

The loading apparatus can further comprise a chute adjustment mechanism for adjusting an angle of the chute assembly with respect to the conveyor belt. An adjustable positional lock assembly can be connected to the frame for supporting the chute assembly at a desired angle. According to one aspect of the invention the positional lock assembly can include a plurality of holes in the first side wall for insertion of a pin. Each hole of the plurality of holes can be associated with a different angle for the chute assembly.

The loading apparatus can further comprise a first adjustment rod assembly connected to the first side wall of the frame and the first deflector plate for adjusting an angle of the first deflector plate. Similarly, the apparatus can further comprise a second adjustment rod assembly connected to the second side wall of the frame and the second deflector plate for adjusting an angle of the second deflector plate. Additional adjustment assemblies can be included as necessary.

The chute assembly can be lined with a wear resistant material. In particular, the material can be abrasion resistant steel plate, chrome carbide overlay, stainless steel, ceramic, polyurethane, ultra high molecular polyethylene, other plastics and other similar materials.

In accordance with another aspect of the invention, a loading apparatus for a granular material conveyor system having a conveyor belt is provided. The loading apparatus comprises a chute assembly mounted to a frame over the conveyor belt. The chute assembly has a first end, a second end opposed to the first end, a pair of opposed lateral edges, and an upper surface. The upper surface is downwardly sloping from the first end to the second end to form a first angle within a range of possible angles with respect to a first plane extending through the conveyor belt to promote the flow of material from the first end to the second end by the effects of gravity. The first end is mounted for rotational motion about a first axis drawn perpendicular to the lateral edges. The loading apparatus also includes a positional lock assembly connecting the chute assembly to the frame. The positional lock assembly has an arm for adjusting the first angle to a desired angle within the range of angles.

The loading apparatus also includes a first side deflector panel mounted to the frame over the conveyor belt. The first side deflector has opposed ends, opposed lateral edges, and an upper surface. The upper surface is downwardly sloping and forms a second angle from a range of angles with respect to a second plane extending perpendicular to the first plane. The apparatus further includes a first adjusting rod assembly connecting the first side deflector to the frame for adjusting the second angle within the range of angles.

The loading apparatus can also include a second side deflector panel mounted to the frame over the conveyor belt. The second side deflector having opposed ends, opposed lateral edges, and an upper surface, the upper surface is downwardly sloping and forms a second angle from a range of angles with respect to a second plane extending perpendicular to the first plane. A second adjusting rod assembly can be used to connect the second side deflector to the frame for adjusting the second angle of the second side deflector within the range of angles.

The frame can include a first wall positioned on a first side of the conveyor belt and a second wall positioned on a second side of the conveyor belt wherein the chute assembly is supported between the first wall and the second wall. Each of the first side wall and the second side wall can be formed from a plurality of elongated panels.

The chute assembly can include a central segment, a first flanking segment connected to a first side of the central segment and a second flanking segment connected to a second side of the central segment.

The loading apparatus can further comprise a chute adjustment mechanism for adjusting an angle of the chute assembly with respect to the conveyor belt. The loading apparatus can include a positional locking assembly. The positional lock assembly can vary. In accordance with one aspect, shown in the Figures, the positional lock assembly includes a plurality of holes on the first side wall that cooperate with a pin for positioning the chute assembly at one of a plurality of different angles. A similar assembly can be incorporated in the second side wall.

The chute assembly and/or the deflector plates can be lined with a wear resistant material. The liner material can be abrasion resistant steel plate, chrome carbide overlay, stainless steel, ceramic, polyurethane, ultra high molecular polyethylene, other plastics and other similar materials.

Other features and advantages of the invention will be apparent from the following specification taken in conjunction with the following Figures and Attachments.

BRIEF DESCRIPTION OF THE DRAWINGS

To understand the present invention, it will now be described by way of example, with reference to the accompanying drawings in which.

DETAILED DESCRIPTION

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The present invention is directed to a precision loading apparatus for moving bulk, granular material onto a moving belt conveyor. The loading apparatus is adjustable to ensure the material is centrally loaded on the conveyor while minimizing dust and spillage. The loading apparatus also ensures that material does not impact the belt in a direct 90 degree force but rather loads at a soft angle to minimize dust and spillage.

Figure 1:
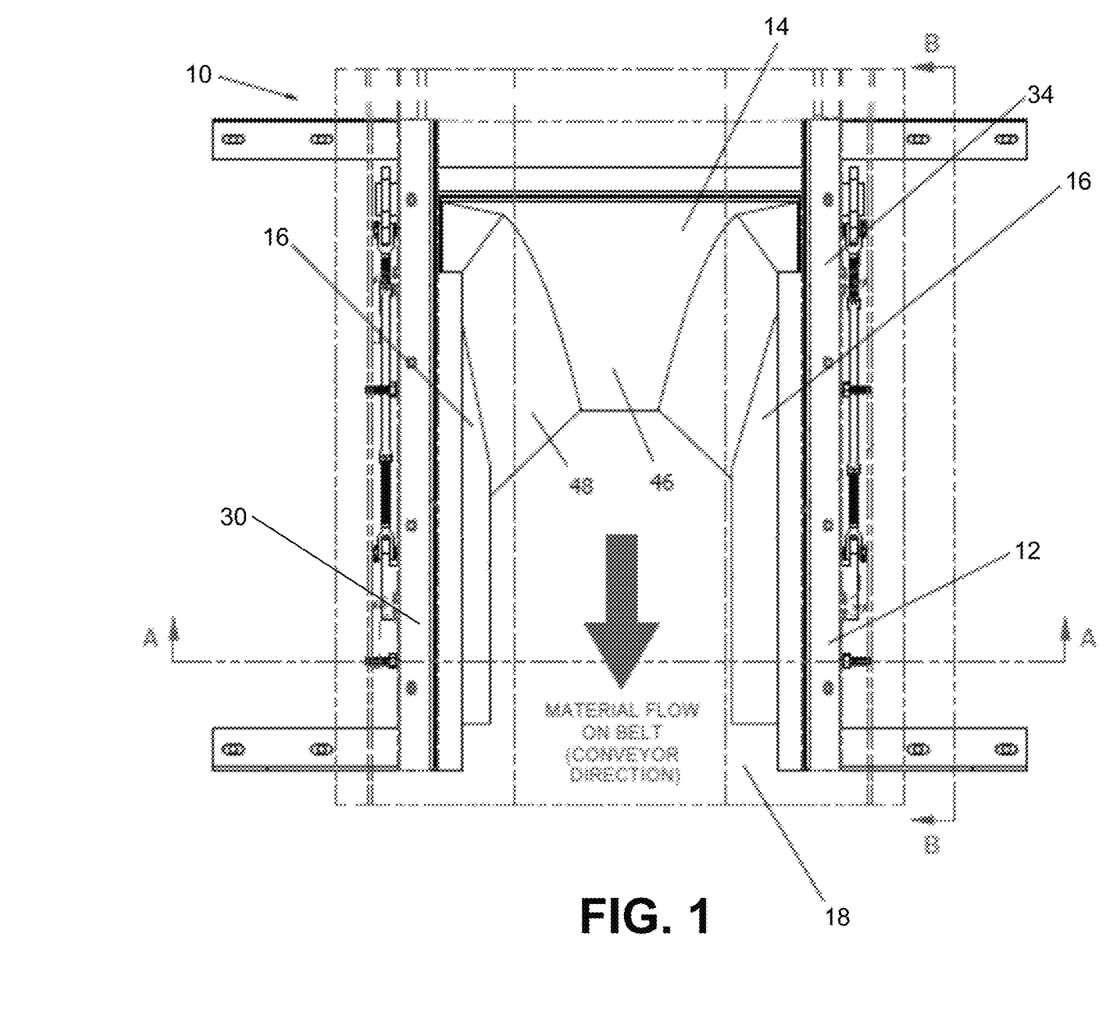
FIG. 1 is a top plan view of a loading apparatus for a granular material conveyor system in accordance with the present invention.

FIG. 1 shows a top view of a loading apparatus 10 for transferring a granular material to a conveyor belt 18 in accordance with an embodiment of the present invention. The loading apparatus 10 includes a frame 12 supporting a flow centering chute assembly 14 having a trough like shape. The flow centering chute 14 redirects the material being loaded to the conveyor belt 18 in the direction the belt 18 is moving so as to minimize impact. The loading apparatus 10 also includes a pair of flow centering side deflector panels or plates 16 disposed at lateral edges of the centering chute 14. The centering chute 14 and each of the side deflectors 16 are independently adjustable. Both the centering chute 14 and the deflectors 16 can be lined with a resistant material, such as abrasion resistant steel plate, chrome carbide overlay, stainless steel, ceramic, plastic and other similar materials to reduce wear from the flow of abrasive materials.

Figure 4:
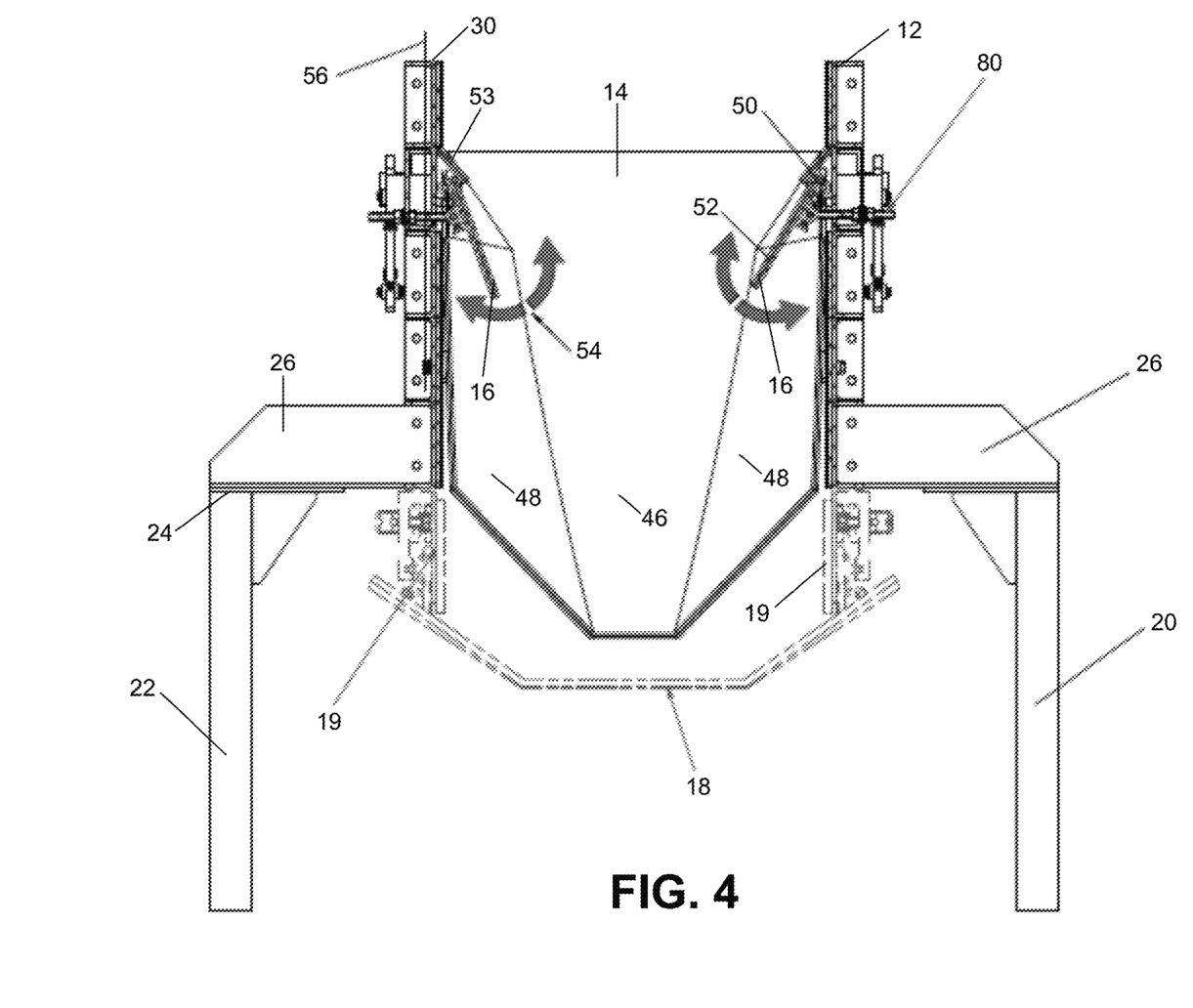
FIG. 4 is an end elevation view of the loading apparatus of FIG. 1.

As also illustrated in FIG. 4, the frame 12 is configured to position the centering chute 14 and the side deflectors 16 over a portion of the conveyor belt 18. As shown in cross-section, the conveyor belt 18 has a flat (i.e., horizontal) middle section and two upwardly extending, sloped side sections. A liner assembly 19 is positioned on opposing sides of the conveyor belt 18 in each of the sloped side sections of the conveyor belt 18. In the example of FIG. 4, the frame 12 is positioned just above the wear liner assembly 19 shown extending upward from the side sections of the conveyor belt 18.

Figure 3:
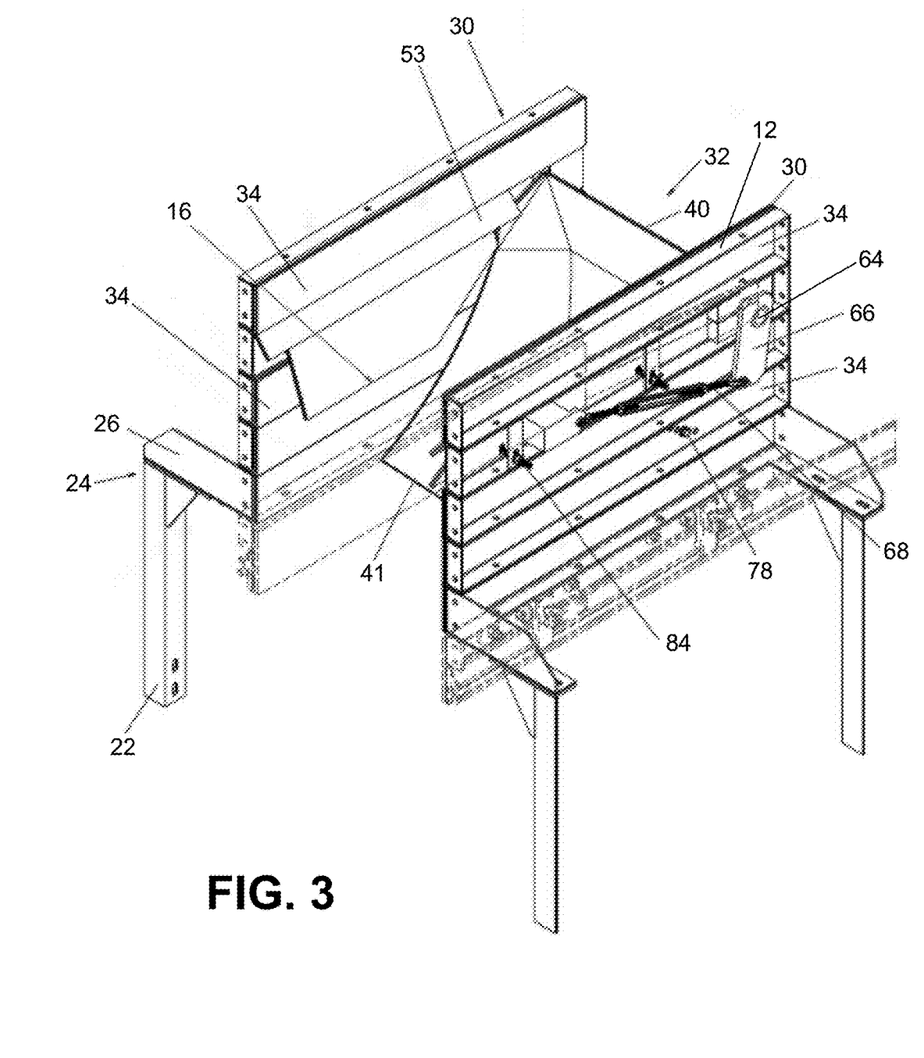
FIG. 3 is a perspective view of the loading apparatus of FIG. 1.

As shown in FIG. 3, the frame 12 includes four upstanding legs 20 having a lower surface engaging end 22 and an upper end 24 connected to a cross beam 26. The frame 12 also includes an opposed pair of side walls 30 supported by the cross beams 26 and separated from one another by a gap 32 spanning the majority of the width of the conveyor belt 18. In one preferred form, each of the side walls 30 is modular being formed by a plurality of elongated panels 34 stacked to form a wall of a desired height. The frame 12 can also be configured to mount to an existing frame for the conveyor belt 18.

Figure 2:
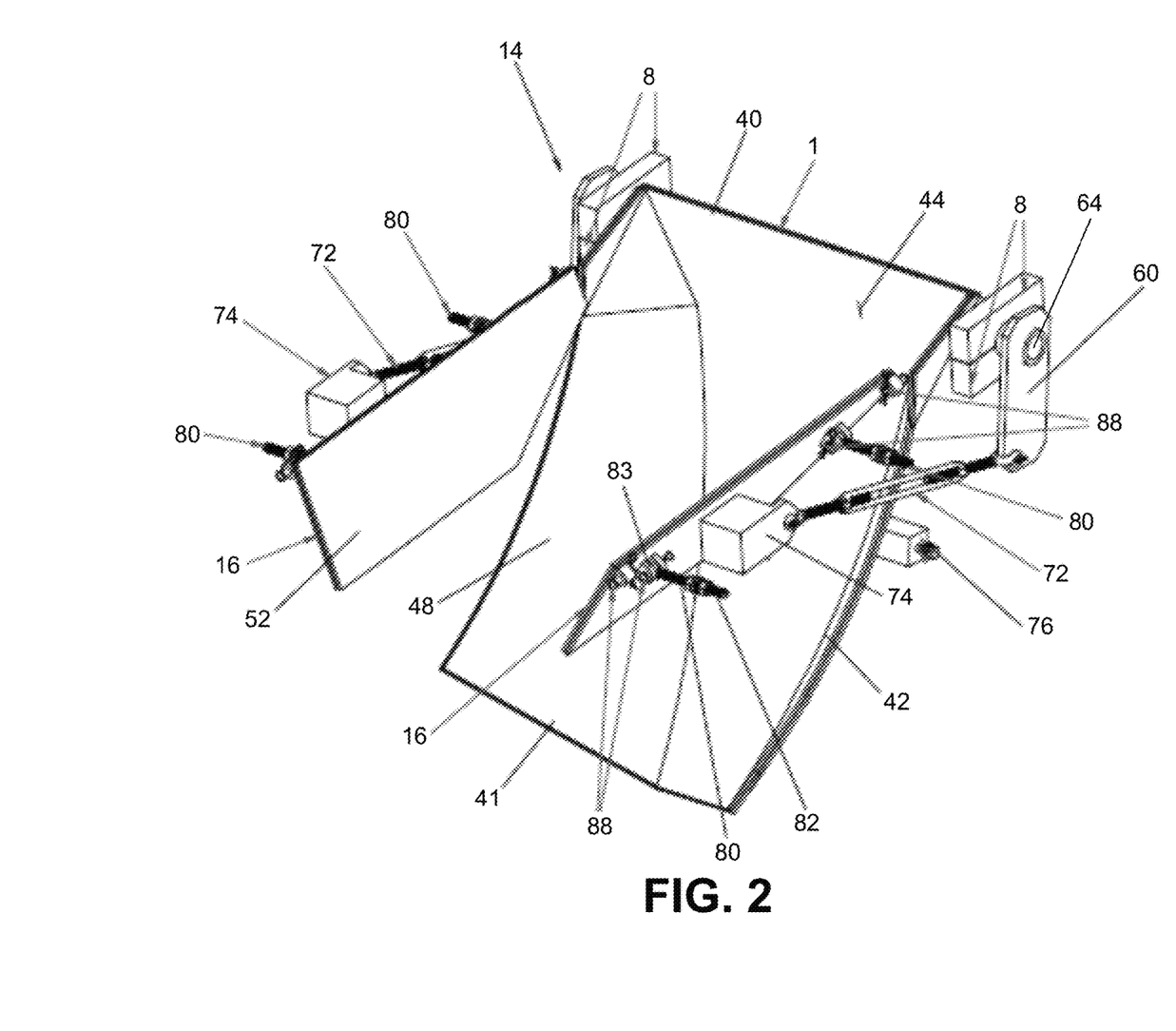
FIG. 2 is a perspective view of a centering chute assembly, side deflector assemblies and chute adjustment mechanism of the loading apparatus of FIG. 1.

Referring to FIGS. 1 and 2, the centering chute 14 is generally rectangular in shape having a top end 40, a bottom end 41, a pair of opposed lateral edges 42, and a top surface 44. The top surface 44 is downwardly sloping from the top end 40 to the bottom end 41 to allow for granular material to flow by force of gravity there along to the conveyor belt 18 below. The top surface 44 can be segmented into a central segment 46, and two flanking segments 48 on either side of the central segment 46 to direct the flow of granular material toward the central segment 46 so that the granular material is deposited onto a central portion of the underlying conveyor belt 18. In one form, the central segment 46 is generally arcuate in cross sectional dimension to form a generally convex outer shape. The flanking segments 48 are upstanding in vertical dimension and form an angle with the central segment to form a generally U-shaped chute 14 in vertical cross section.

The top end 40 of the chute 14 is connected by an axle 64 to one or both of the side walls 30 and allows for rotational movement of the centering chute 14, using an adjustment mechanism and a positional lock assembly described below, within a range of angles with respect to a horizontal plane. The angle of the chute 14 can be selected by an operator of the loading apparatus to affect the flow rate of the granular material sliding onto the upper surface of the chute assembly 14 and to the conveyor belt 18. This not only affects the flow rate but it also affects the material velocity and direction. The system can be adjusted to minimize impact of the material on the belt 18 and reduce dust and spillage.

The flow centering side deflectors 16 are generally rectangular slats whose length dimension extends outward from a top portion of the centering chute 14 in the direction of the conveyor belt 18. The side deflectors 16 are connected by a hinge 50 (see FIG. 4) to the side walls 30 of the frame 12 and have an upper surface 52 that is downwardly sloping to direct the flow of granular material into the centering chute 14 and the conveyor belt 18. A hinge cover panel 53 is mounted to an interior portion of each side wall 30 and extends over the hinge 50 to protect it from contact by the inflow of granular material (see FIG. 3). One or more adjustment rod assemblies 80, described below, allow for adjustment of an angle 54 (FIG. 4) the side deflector 16 forms with a vertical axis 56 drawn through the walls 30 of the frame 12.

Figure 5:
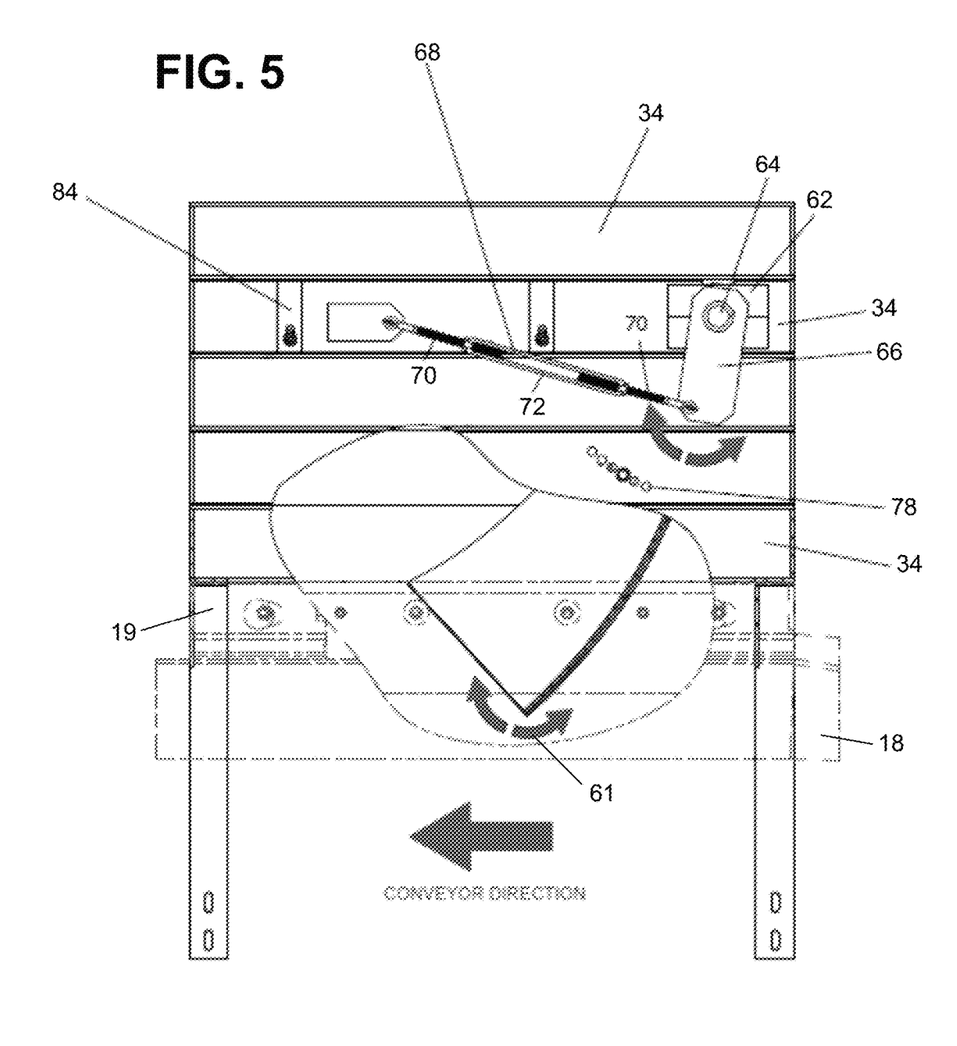
FIG. 5 is a side elevation view of the loading apparatus of FIG. 1.

FIGS. 2, 3, and 5 show a chute adjustment mechanism 60 for adjusting the angle 61 of the centering chute 14 with respect to the horizontal axis. The chute adjustment mechanism 60 has a bearing housing 62 mounting an axle or pivot shaft 64 for rotational motion of the centering chute 14. A plate 66 connects a distal end of the axle 64 to an adjustment rod assembly 68. The adjustment rod assembly 68 has two arms 70, connected therebetween by a turnbuckle 72, to connect the plate 66 to an adjuster base mount 74 mounted to a surface of the side wall 30 of the frame 12. A positional locking assembly is provided to lock the chute 14 at the desired angle after adjustment.

The positional locking assembly includes an arm 76, shown in FIG. 2, which has one end connected to the centering chute 14 (or supporting a rear surface thereof) and an opposed end connected to one of the elongated panels 34 of the side walls 30 of the frame 12. A threaded fastener extends through a hole in the elongated panel 34 of the side wall 30 to fix the chute 14 at a designated angle. A plurality of holes 78 in one of the elongated panels 34 of the side wall 30 of the frame 12, are provided to lock the position of the centering chute 14 at a desired angle by an operator of the loading apparatus 10.

The Figures also disclose an adjustment rod assembly 80 for adjusting the angle of the deflector plates 16. The adjustment rod assembly 80 has a rod 82 that connects to an outer surface of the deflector plate 16 on one end 83. The rod 82 extends through a hole in the wall where it terminates in a threaded fastener 84. Adjustments to the threaded fastener 84, by a tool used by an operator on an exterior side of the side wall 30, adjusts the length of the rod to change the angle the deflector plate 16 makes with the vertical axis 56. Two adjustment rod assemblies 80 are shown for each deflector plate and are spaced horizontally from one another. The adjustment rod assemblies are connected to the side deflector plates 16 by a retainer pin (e.g., a clevis pin) 88. Each defector plate 16 can be adjusted to a different angle.

The chute adjustment mechanism and the side deflector adjustment assemblies can also use hydraulic equipment or electrical/mechanical or other systems to move the chute and plates to the desired angles.

The chute assembly 14 and deflector panels 16 can be formed from steel, stainless steel, alloys or other similar materials, and the frame 12 can also be formed from steel, stainless steel, alloys or other similar materials. Similarly, the adjustment assemblies 60, 80 can be formed from steel, stainless steel, alloys or other similar materials.

Many modifications and variations of the present invention are possible in light of the above teachings. It is, therefore, to be understood within the scope of the appended claims the invention may be protected otherwise than as specifically described.

We claim:

1. A loading apparatus for a granular material conveyor system having a conveyor belt, the apparatus comprising:
    an adjustable chute assembly wherein the chute assembly is rotatable about an axis to change the angle of the chute assembly with respect to the conveyor belt; and,
    an adjustable first side deflector plate positioned along a first side of the chute assembly wherein the first side deflector plate is rotatable about an axis to change an angle of the first side deflector plate with respect to the conveyor belt;
    an adjustable second side deflector plate positioned along a second side of the chute assembly wherein the second side deflector plate is rotatable about an axis to change an angle of the second deflector plate with respect to the conveyor belt;
    a frame supporting the chute assembly, the first deflector plate and the second deflector plate above the conveyor belt, wherein the frame includes a first wall positioned on a first side of the conveyor belt and a second wall positioned on a second side of the conveyor belt wherein the chute assembly is supported between the first wall and the second wall;
    a chute adjustment mechanism for adjusting an angle of the chute assembly with respect to the conveyor belt; and,
    an adjustable positional lock assembly connected to the frame for supporting the chute assembly at a desired angle, wherein the positional lock assembly includes a plurality of holes in the first side wall for insertion of a pin, each hole of the plurality of holes associated with a different angle for the chute assembly.

2. The loading apparatus of claim 1 wherein the chute assembly includes a central segment, a first flanking segment connected to a first side of the central segment and a second flanking segment connected to a second side of the central segment.

3. The loading apparatus of claim 1 wherein each of the first side wall and the second side wall is formed from a plurality of elongated panels.

4. The loading apparatus of claim 1 further comprising:
    a first adjustment rod assembly connected to the first side wall of the frame and the first deflector plate for adjusting an angle of the first deflector plate; and, a second adjustment rod assembly connected to the second side wall of the frame and the second deflector plate for adjusting an angle of the second deflector plate.

5. The loading apparatus of claim 1 wherein the chute assembly is lined with a wear resistant material.

6. A loading apparatus for a granular material conveyor system having a conveyor belt, the apparatus comprising:
a chute assembly mounted to a frame over the conveyor belt having a first end, a second end opposed to the first end, a pair of opposed lateral edges, and an upper surface, the upper surface is downwardly sloping from the first end to the second end to form a first angle within a range of possible angles with respect to a first plane extending through the conveyor belt to promote the flow of material from the first end to the second end by the effects of gravity, the first end is mounted for rotational motion about a first axis drawn perpendicular to the lateral edges;
a positional lock assembly connecting the chute assembly to the frame having an arm for adjusting the first angle to a desired angle within the range of angles, wherein the positional lock assembly includes a plurality of holes on the first side wall that cooperate with a pin for positioning the chute assembly at one of a plurality of different angles;
a first side deflector panel mounted to the frame over the conveyor belt, the first side deflector having opposed ends, opposed lateral edges, and an upper surface, the upper surface is downwardly sloping and forms a second angle from a range of angles with respect to a second plane extending perpendicular to the first plane; and,
a first adjusting rod assembly connecting the first side deflector to the frame for adjusting the second angle within the range of angles.

7. The loading apparatus of claim 6 comprising:
a second side deflector panel mounted to the frame over the conveyor belt, the second side deflector having opposed ends, opposed lateral edges, and an upper surface, the upper surface is downwardly sloping and forms a second angle from a range of angles with respect to a second plane extending perpendicular to the first plane.

8. The loading apparatus of claim 7 comprising:
a second adjusting rod assembly connecting the second side deflector to the frame for adjusting the second angle of the second side deflector within the range of angles.

9. The loading apparatus of claim 8 wherein the frame includes a first wall positioned on a first side of the conveyor belt and a second wall positioned on a second side of the conveyor belt wherein the chute assembly is supported between the first wall and the second wall.

10. The loading apparatus of claim 9 wherein each of the first side wall and the second side wall is formed from a plurality of elongated panels.

11. The loading apparatus of claim 9 further comprising a chute adjustment mechanism for adjusting an angle of the chute assembly with respect to the conveyor belt.

12. The loading apparatus of claim 6 wherein the chute assembly includes a central segment, a first flanking segment connected to a first side of the central segment and a second flanking segment connected to a second side of the central segment.

13. The loading apparatus of claim 6 wherein the chute assembly is lined with a wear resistant material.

* * * * *